UNITED STATES PATENT OFFICE.

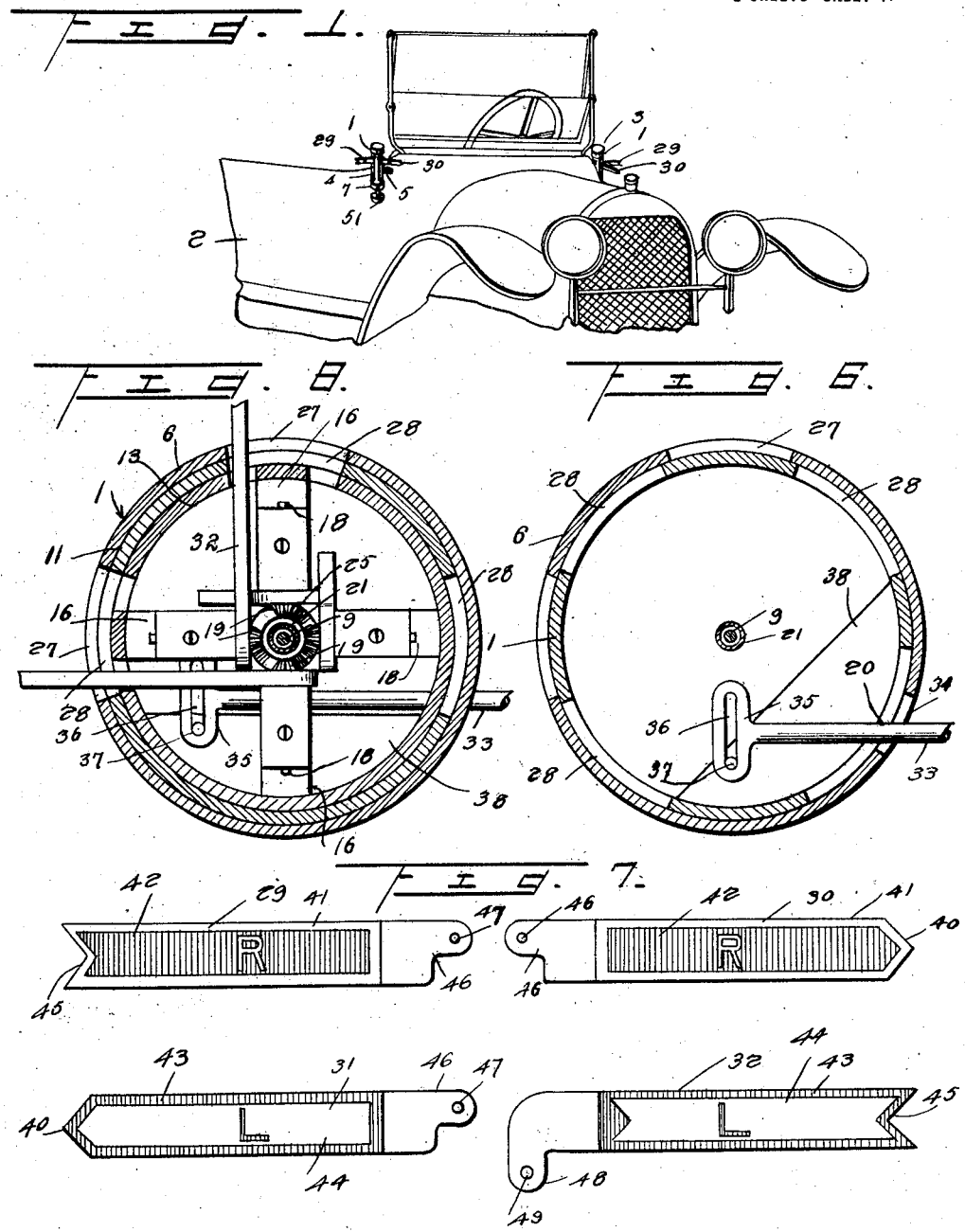

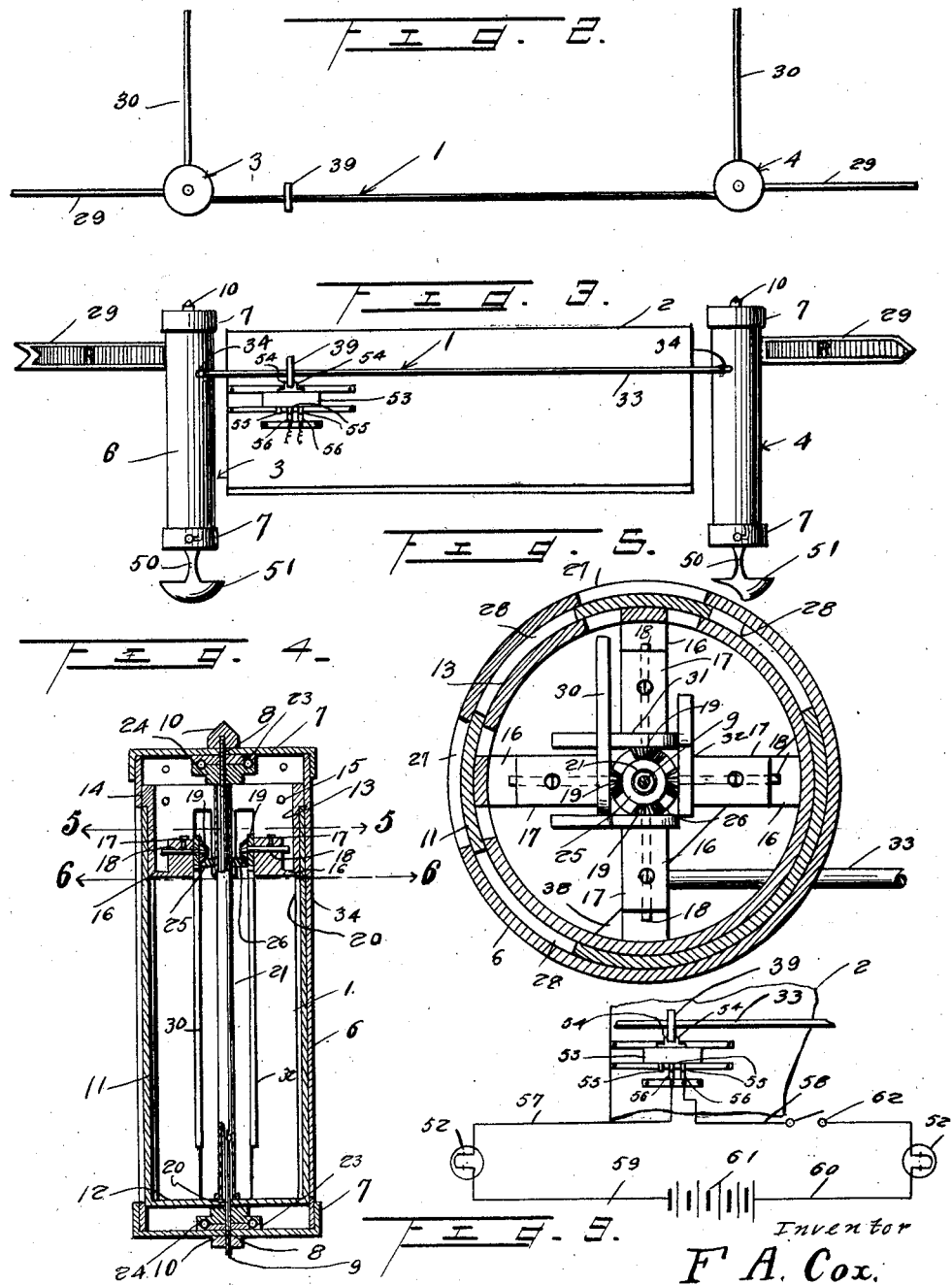

FREDERICK AVERY COX, OF CHICAGO, ILLINOIS.

SAFETY-SIGNAL.

1,362,234. Specification of Letters Patent. Patented Dec. 14, 1920.

Application filed February 28, 1920. Serial No. 361,996.

*To all whom it may concern:*

Be it known that I, FREDERICK AVERY COX, a citizen of the United States, residing at Chicago, in the county of Cook and State of Illinois, have invented certain new and useful Improvements in Safety-Signals; and I do hereby declare the following to be a full, clear, and exact description of the invention, such as will enable others skilled in the art to which it appertains to make and use the same.

This invention relates to signals and the primary object of the invention is to provide an improved signal for vehicles for indicating to persons in their vicinity the direction intended to be taken by the driver, so that the necessary precautions can be taken.

Another object of the invention is to provide an improved appearing and disappearing signal for air, land and water conveyances operated from the driving seat bearing a suitable legend and being of suitable configuration, so that persons in other conveyances can readily tell the course intended to be taken by the said conveyance.

A further object of the invention is to provide an improved direction indicator for vehicles, which can be readily seen from the front, rear and sides of the vehicle and which will plainly indicate the direction which the vehicle is going to pursue.

A further object of the invention is to provide an improved direction indicator for vehicles, which can be seen for a considerable distance from the vehicle and which is so arranged in relation to the vehicle as not to obstruct the view of the driver, but which can be seen from all sides and all angles of the vehicle.

A further object of the invention is to provide a self contained mechanically operated direction indicator for vehicles which can be readily actuated from the driver's seat without interfering with any other parts of the vehicle.

A still further object of the invention is to provide an improved direction indicator for vehicles of the class described, which is durable and efficient in use, which can be readily attached to vehicles of any width, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a detail perspective view of the improved signal showing the same applied to an automobile.

Fig. 2 is a top plan view of the improved signal removed from the vehicle, with signal arms out, Fig. 3 is a rear elevation of the same, Fig. 4 is a vertical longitudinal section through the signal, Fig. 5 is a detail horizontal section taken on the line 5—5 of Fig. 4, Fig. 6 is a detail horizontal section taken on the line 6—6 of Fig. 4, Fig. 7 is a diagrammatic view showing the signal arms, Fig. 8 is a detail horizontal section taken through one of the cylinders, showing a pair of signal arms in operative position, and Fig. 9 is a diagrammatic view of the electric circuit.

Referring to the drawings in detail, wherein similar reference characters designate corresponding parts throughout the several views, the numeral 1 generally indicates the improved signal, which as shown is connected to a motor vehicle 2.

The signal 1 includes a pair of spaced cylinders 3 and 4, which are identical in construction and one of the same is located on one side of the vehicle and the other is located on the other side and the same are secured in position by suitable supporting brackets 5. Each of the cylinders 3 and 4 includes an outer stationary casing 6, which is held in place by the bracket 5 and has the removable end caps 7 which are provided with a pair of alined openings 8 to receive a bolt 9 which extends vertically through the casing. Suitable nuts 10 are threaded on the outer terminals of the bolt and hold the caps against displacement. An inner rotatable cylinder 11 is positioned in the casing 6 and has its upper end open and its lower end closed by a bottom wall 12. As shown, the upper end of the inner cylinder 11 ends short of the upper end of the casing and the same is rotatably held in position by means of a collar 13, having the annular outwardly projecting rib 14 formed thereon which engages the inner surface of the casing 6 and is held in position by suitable bolts or rivets 15. Thus, it will be seen that the annular rib spaces the lower end of the collar from the casing 6 and forms means for rotatably receiving the upper end of the inner cylinder 11. The collar 13 is provided with inwardly extending lugs 16, located at substantially ninety degrees from each other, and the inner terminals of the lugs 16 carry bearing blocks 17 which rotatably receive the inwardly extending shafts 18 having the relatively small bevel pinions 19 keyed thereto, the purpose of which will be hereinafter more fully described.

As clearly shown in Fig. 4 of the drawings, the lower wall 12 of the inner cylinder 11 is provided with an opening 20 which registers with the openings 8 formed in the caps 7 of the casing and receives the bolt 9.

A hollow shaft 21 is arranged in the inner cylinder 11 and is rotatably mounted on the bolt 9 and has its lower end secured to the end wall 12 of the cylinder and is adapted for rotation with the cylinder. The inner surfaces of the end caps 7 carry sections of ball bearing races 23, which receive ball bearings 24 and the upper end of the hollow shaft and the lower surface of the end wall 12 carry the other sections of the ball bearing races and form means whereby the hollow shaft and the inner cylinder may be easily rotated. The hollow shaft 21 has keyed thereto a beveled wheel 25 which is provided with spaced sets of gear teeth 26 which are adapted to be brought into engagement with the relatively small pinions 19 for rotating the shafts 18.

The casing 6 is provided with two or more angularly related slots 27 which are located respectively at the front and outer side of the casing and the inner cylinder 11 is provided with two or more angularly related spaced longitudinally extending slots 28 which are adapted to be brought into alinement with the slots 27. The inner cylinder 11 is provided with three slots, two of which are adapted to be brought into registration with the slots 27 according to the direction in which the inner cylinder is rotated. The shafts 18 have keyed thereto signal arms 29, 30, 31 and 32. The signal arms 29 and 30 have the word "Right" written thereon and are adapted to be projected outwardly at right angles to each other and to the casing, so as to show that the vehicle is going to be turned to the right. The signal arms 31 and 32 have "Left" written thereon and are adapted to be projected to the forward and outer side of the casing at right angles to each other and to the casing so as to show that the vehicle is going to be turned to the left. It can be seen that the arms 29 and 30 are operated together and when the same are operated the arms 31 and 32 are held motionless and when the arms 31 and 32 are operated, the arms 29 and 30 are held motionless. This is accomplished through the spaced sets of gear teeth 26. The beveled wheel 25 has sufficient teeth thereon and the gears 19 all are of a desired ratio that the signaling arms will be moved outwardly of the casings and into the horizontal positions on a comparatively small movement of the rod 33.

The hollow shaft 21 and the inner cylinder 11 are rotated by means of an operating rod 33 which extends across the dashboard of the vehicle 2 and extends into both the cylinders 3 and 4. The casing 6 and the inner cylinder 11 are provided with concentric arcuate slots 34 for the reception of the operating rod 33. The outer terminal of the operating rod 33 is enlarged as at 35 and is provided with a slot 36 which loosely receives the pin 37 carried by the plate 38 secured to the inner cylinder. The operating rod 33 is provided with a suitable operating handle 39 by means of which the operating rod may be moved back and forth for rotating the hollow shaft and inner cylinder for operating the arms.

The signal arms 29 and 30 bearing the word "Right" are preferably colored and shaped differently from the signal arms 31 and 32 bearing the word "Left" so that the same can be readily distinguished from each other. As shown in the detail view of the arms, the signal arms 29 and 30 are pointed as at 40 and the arms are provided with a white border 41 and a colored center 42, while the signal arms 31 and 32 are provided with a colored border 43 and a white center 44 and the arms 31 and 32 have their outer ends notched as at 45.

The arms 29, 30 and 31 are provided with reduced ears 46 having openings 47 for the reception of the shafts 18 and the signal arm 32 is provided with an offset ear 48 provided with an opening 49 for the reception of one of the shafts 18. The ear 48 is offset, so as to provide sufficient room for the plate 38.

From the foregoing description, it can be seen that an improved signal is provided for vehicles which can be readily operated from the driver's seat and which will operate pairs of signal arms so as to indicate to persons in the vicinity the direction in which the vehicle is going to turn.

The outer casings 6 carry depending brackets 50 which are formed on the lower end caps 7 and these brackets 50 carry reflectors 51, in which are positioned the ordinary or any preferred type of incandescent lamps 52. The lamps are provided so that the signal arms can be illuminated at night time, so that they may be readily seen.

The device is so constructed that the lamps will only be lighted when the signal arms are in operative signaling position and, as clearly shown in Fig. 9 of the drawings, the dashboard of the automobile 2 is provided with a sliding insulated plate 53, having the ears 54 formed on its upper edge which are positioned on each side of the operating handle 39 so that when the actuating rod 33 is operated, the plate will be operated therewith. The sliding plate 53 carries the spaced contact points 55 which are adapted to be brought into and out of engagement with the contact terminals 56 from which extend the wires 57 and 58 leading to one terminal of the incandescent lamps 52. The opposite terminal of the incandescent lamps 52 have wires 59 and 60 leading to any suitable electric power source 61. A suitable hand operating switch 62 is provided so that the circuit may be opened when desired.

In attaching the device to vehicles already constructed, the two cylinders containing the mechanism are attached to the cowl, near the lowest line of the wind shield, but in the event of its being adapted for standard equipment by vehicle manufacturers, the casings can be incorporated in the cowl in such a manner as to be almost invisible.

Four signals are possible with this device, namely, right turn, left turn, slow and stop. When it is desired to indicate that the vehicle is going to stop the arms are actuated rapidly a number of times. As before stated the signal arms are enameled in contrasting colors and their form indicates direction to persons who are color blind. The arms are opened half way when the vehicle is going to be brought to a stop.

The working parts are fitted with ball bearings so that the arms appear and disappear instantly by slight movement of the fingers of one hand.

The device is of such size and configuration as can be readily mailed by parcel post and attached by any good mechanic to the ordinary type of vehicle.

From the foregoing description, it can be seen that when the operating handle is moved to either side the sliding plate is carried therewith thus bringing the contact plates 55 into engagement with the spaced contact points 56 and closing the circuit thus lighting the incandescent lamps 52.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when required without sacrificing any of the advantages of my invention as set forth.

What I claim as new is:

1. A direction indicator for vehicles comprising a casing positioned on each side of the vehicle, pairs of signal arms located at right angles to each other and positioned in the casing, a sliding operating rod, and means operatively connecting the operating rod with the arms for operating a certain pair of the arms in each casing when desired.

2. A direction indicator for vehicles including a casing positioned on each side of the vehicle, an operating rod extending from one casing to the other, pairs of pivoted signal arms positioned in each casing, and located at right angles to each other and adapted to be projected from the forward and outer sides of said casing, and means operatively connecting the terminals of the operating rod to said pairs of signal arms for operating either pair of said signal arms in the casings as may be desired.

3. A direction indicator for vehicles including a cylindrical casing having spaced longitudinally extending slots formed therein, an inner rotatable cylinder positioned in said casing, longitudinally extending slots formed in said inner cylinder and adapted to aline with the slots formed in the outer casing, pairs of operating arms arranged in the inner cylinder and adapted to be projected through said slots in the casing and cylinder when the same are in alinement, means operatively connecting the inner cylinder with said arms, and means for rotating said cylinder in either direction, as and for the purpose specified.

4. A direction indicator for vehicles comprising a pair of cylindrical casings located on opposite sides of the vehicle, an inner rotatable cylinder mounted in each casing, the casings having spaced slots formed therein opening out through the forward and side faces thereof, the inner cylinders having slots therein arranged to register with the slots in the casings, a pin carried by and mounted eccentrically of the inner cylinder, an operating rod having its terminals loosely connected to said pins, an operating handle on said rod, a bracket rigidly secured to the outer casing, signal arms pivotally carried by said brackets, and means operatively connecting the arms with the cylinder for raising certain of said arms when certain of the slots in the inner cylinder and cylindrical casing are in registration, as and for the purpose specified.

5. A direction indicator of the class described including a stationary cylindrical casing, a bracket rigidly secured to the casing adjacent the upper end thereof, right angularly disposed bearing blocks carried by said brackets, a shaft rotatably mounted in said bearing blocks, signal arms keyed to said shafts, said casing having a pair of right angularly disposed longitudinally extending slots formed therein, a shaft, rotatably carried by the casing and extending longitudinally of the same, a beveled wheel keyed to said shaft and having spaced gear teeth sections formed thereon, bevel pinions keyed to said first mentioned shaft and arranged to mesh with the gear teeth sections, an inner rotatable cylinder mounted in the casing and arranged to normally close the slots in the casing, means operatively connecting the casing and longitudinally extending shaft for synchronous movement, the inner casing having a plurality of spaced slots formed therein arranged to be brought into and out of registration with the slots in the casing, and means for rotating the inner cylinder and hollow shaft, as and for the purpose specified.

6. A signal for vehicles including a hollow casing, signal arms mounted in said casing, means for operating the signal arms, end caps carried by the casing, a reflector carried by and arranged below the lower end cap, and illuminating means carried by said reflector, as and for the purpose specified.

7. A direction indicator for vehicles comprising a stationary cylindrical casing, a rotatable cylindrical casing, said casings having longitudinally extending slots adapted to be brought into and out of registration with each other, signal arms carried by one of the casings, and means for operating the arms and the rotatable casing, as and for the purpose specified.

In testimony whereof I affix my signature in presence of two witnesses.

FREDERICK AVERY COX.

Witnesses:
ARTHUR A. DESPRES,
LESTER NOVA.